July 16, 1946.  E. H. LAND  2,404,301
RANGE FINDER
Filed March 2, 1943

Edwin H. Land
INVENTOR.
BY Donald L. Brown
Attorney

Patented July 16, 1946

2,404,301

UNITED STATES PATENT OFFICE 2,404,301

RANGE FINDER

Edwin H. Land, Cambridge, Mass., assignor to Polaroid Corporation, Cambridge, Mass., a corporation of Delaware Application March 2, 1943, Serial No. 477,707

10 Claims. (Cl. 88—2.6)

This invention relates to a new and improved range finder and reticles therefor.

It is one object of the invention to provide a range finder comprising means for impressing optical indicia upon the field of view at a predetermined apparent distance from the instrument and thereby determining the distance of objects in said field from the observer.

Another object is to provide a range finder of the above characteristics wherein a plurality of optical indicia are impressed upon the field of view, each at predetermined different apparent distances from the instrument.

A further object is to provide a range finder of the above characteristics wherein the desired optical indicia are produced by means of a collimating lens and reticle means comprising one or more indicia marks each positioned in predetermined relation to the focal plane of said lens.

A still further object is to provide a new and improved reticle adapted for use in the range finder of the present invention and comprising a composite sheet composed of a plurality of superimposed layers of transparent material, particularly plastic material, each of which layers bears thereon an indicia mark.

Other objects and advantages will in part be apparent and in part be pointed out in the course of the following description of one or more embodiments of the invention, which are given as non-limiting examples, in connection with the accompanying drawing, in which.

Figure 1:
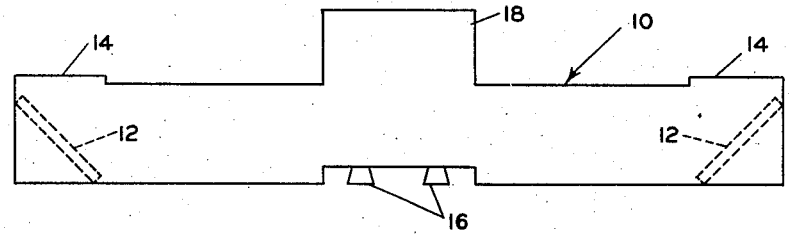
Figure 1 is a plan view of a housing suitable for a range finder constituting an embodiment of the invention.

In the form of the invention illustrated in the drawing, housing 10 of any desired size and shape is provided with a pair of mirrors or other reflecting surfaces 12 adapted to receive light from in front of the instrument through the windows or apertures at 14. This arrangement serves both to provide an effectively enlarged interocular distance or increased stereoscopic effect, and also to limit the field of view to an area substantially in front of the instrument. Associated with mirrors 12 is a pair of transparent mirrors 15 each of which is adapted to receive light from one of mirrors 12 and to reflect it towards one of eyepieces 16.

An observer employing this range finder will look simultaneously through both of eyepieces 16 with the result that his right eye will receive light from right-hand mirrors 12 and 15, and his left eye will simultaneously receive light from left-hand mirrors 12 and 15. It is to be understood that mirrors 15 and mirrors 12 should be so positioned as to enable an observer employing the instrument to see substantially the same field with each eye. Such a structure, except for the use of transparent mirrors 15 instead of wholly reflecting surfaces, is standard in the construction of range finders of the class of the present invention. Its effect and purpose is to increase the effective interocular distance of the observer by the distance between mirrors 12, and thus to increase considerably the stereoscopic acuity of his vision as applied to the field.

Figure 2:
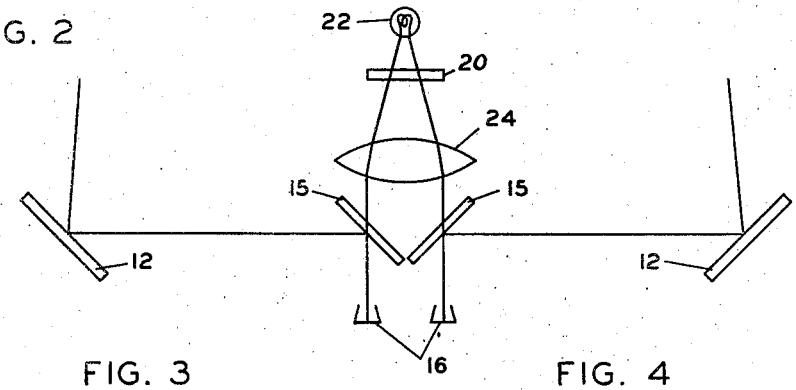
Fig. 2 illustrates diagrammatically and in plan the optical elements employed in one embodiment of the invention.
Figure 3:
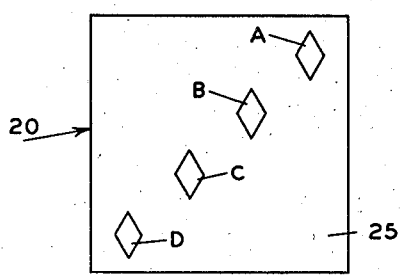
Fig. 3 is an enlarged, diagrammatic front view illustrating an embodiment of the reticle means of the present invention.
Figure 4:
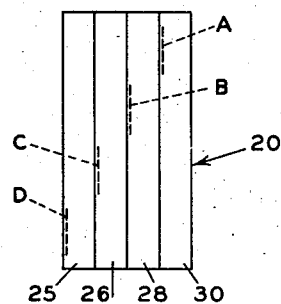
Fig. 4 is a similar side view of the reticle means shown in Fig. 3.

The indicia-forming apparatus of this embodiment of the invention is illustrated in detail in Figs. 2, 3 and 4, and may conveniently be located within an extended portion 18 of housing 10. It comprises a reticle 20 of particular characteristics to be described in detail hereinafter, a light source 22 of any desired type and a relatively large lens 24 or other device for collimating the rays emanating from source 22 and traversing reticle 20. The term "reticle" as it is used herein and in the claims is to be understood as having the meaning commonly accorded thereto in the range finder art, and it is to be considered as including any means in the optical system of the instrument for producing visible indicia such, for example, as a line, a dot or a circle or other figure.

In a simple embodiment of the present invention, the reticle means may comprise simply light source 22, which will preferably comprise a vertical line filament illuminated from a suitable source of current (not shown). In this embodiment of the invention, light source 22 will preferably be positioned within the focal plane of lens 24. The relation of its position to the focal plane of the lens will determine its apparent distance from the observer when it is viewed through eyepieces 16. It is believed that the reason for this effect will be readily apparent. If the light source or reticle is positioned at the focal plane of lens 24, the rays from the reticle to eyepieces 16 will all be rendered parallel, and the result will be to cause the reticle image to appear to lie at infinity. If, however, the reticle is positioned within the focal plane of the lens, the rays going to each of eyepieces 16 will diverge slightly from parallelism, with the result that the reticle image will appear to lie nearer than infinity, and the greater this distance between the position of the reticle and the focal plane of the lens, the more said rays will diverge and the nearer to the observer will be the apparent position of the reticle image.

The above-described embodiment of the invention will provide only a single indicia in space. For preferred results, however, there should be a plurality of such indicia, each caused to lie at a different apparent distance from the observer. This effect may be attained by the use of the reticle shown in greater detail in Figs. 3 and 4, which comprises a plurality of sheets 25, 26, 28 and 30, each bearing on a surface thereof a reticle mark A, B, C and D.

In this embodiment of the invention, reticle 20 will be positioned in predetermined relation to the focal plane of lens 24. For example, reticle 20 may be so positioned that mark A of sheet 30 will lie substantially in the focal plane of the lens. Marks B, C and D will therefore lie at different distances within the focal plane of the lens. With reticle 20 in this position when the observer looks through eyepieces 16, mark A will appear to lie the farthest away, while mark D will appear close to the observer, mark C the next, and mark B between mark C and mark A.

It will be understood that the relative distances between the indicia-carrying surfaces of sheets 25—30 will be such that said series of indicia will appear to lie at known distances from the instrument. Said distances may in turn be determined in a variety of ways. In the above example it is assumed that mirrors 15 are at right angles to each other and parallel to their associated mirrors 12. In such case mark A will appear to lie at infinity with respect to space, with marks B, C and D progressively nearer the instrument. If, however, mirrors 15 are at right angles to each other and mirrors 12 are at an angle of less than 90 degrees to each other, or vice versa, mark A will appear to lie nearer in space than infinity, with marks B, C and D correspondingly nearer, the actual ranges of said apparent positions being dependent in each case upon the base line of the device, i. e., the distance between mirrors 12. Similar variation may be obtained by adjusting reticle 20 with respect to the focal plane of lens 24. For example, reticle 20 may be positioned with mark B in the focal plane of lens 24, and if mirrors 15 are at right angles to each other, mirrors 12 may be set at an angle of less than 90 degrees to each other such that mark A will appear to lie at infinity with respect to the field. If said angle is further reduced below 90 degrees, all said marks will appear to move still nearer to the observer. All such modifications are accordingly to be construed as coming within the scope of the invention.

It will now be understood that in all cases the range finder of the invention will be so calibrated that the series of indicia will appear to lie at known distances from the instrument. An observer using the device may then compute the approximate distance of objects in the field by their relation in space to the apparent positions of said indicia. It will be apparent, furthermore, that the invention contemplates the employment of any useful number of marks, but the essential requirements thereof are fulfilled if only a single mark is used.

Reticles of the type shown in Figs. 3 and 4 may be constructed in a variety of ways. For example, each of sheets 25—30 may comprise a separate sheet of glass or other transparent material such as a transparent plastic having an opaque mark reproduced on one surface thereof. The converse of this construction may also be used, and each reticle mark may comprise a light-transmitting area etched or otherwise produced in an opaque area of one of sheets 25—30, provided that said opaque areas do not overlap so far as to cover the reticle mark on any of the others of said sheets. It has been found particularly useful to prepare such reticles by conventional photographic processes, that is to say, each of the sheets 25—30 may comprise a positive or negative reproduction of the diamond outline illustrated as forming A, B, C and D. The thickness of each sheets 25—30 will be chosen to provide the desired differences in the apparent positions of the indicia thereon when viewed as illustrated in Fig. 2. It will be apparent that said distances will vary depending upon the focal length of lens 24 and on the base line of the instrument, i. e. the distance between mirrors 12.

As an illustrative example, assume that reticle 20 is incorporated in an instrument having a base line of four feet and using a lens 24 having a focal length of eighteen inches. If reticle 20 be so positioned with respect to the focal point of the lens that mark D appears to lie 600 yards from the instrument, and if sheet 25 is approximately .0075 inch in thickness, mark C will appear to lie at 1200 yards from the instrument. If the base line is increased without otherwise changing the design, each mark will appear to lie still farther away and still farther apart from each other, and the converse will be true if the base line is lessened. These conditions, however, will be readily understood by those skilled in the art, and need only be taken into account in the final design and calibration of the instrument.

Range finders of the type of the present invention utilizing reticles of the type illustrated in Figs. 3 and 4 are particularly useful with moving targets or mounted in moving vehicles. For example, it may be assumed that a range finder using reticle 20 is installed in a tank or airplane approaching a target, and that it is desired to hold fire until the range is, for example 200 yards. In this case reticle 20 will be so designed and positioned with respect to the base line of the instrument and focal length of lens 24 that mark D will appear to lie at 200 yards. Similarly, mark C may appear to lie at 300 yards, and mark B may appear to lie at 400 yards. Therefore, as the tank or plane approaches the target, the gunner will known that he should prepare to fire when the apparent position of mark B coincides with the target, should aim when the apparent position of mark C coincides with the target, and should fire when the apparent position of mark D coincides with the target. As another example, it is particularly useful in an airplane to outline only a single mark in reticle 20 whose apparent position will lie at the known range which is the maximum for accurate fire of the plane's guns. Many other examples of useful installations for the range finder of the present invention will be readily apparent to those skilled in the art.

Figure 5:
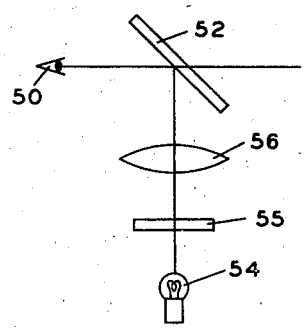
Fig. 5 is a side view, similar to Fig. 2, illustrating diagrammatically a modification of the invention.

It will be understood that the above-described embodiment of the invention is given only by way of illustration, and that it may be modified to a considerable degree without departing from within the scope of the invention. To a considerable extent the construction of the range finders of the invention is determined by the purpose for which they are intended. For example, mirrors 12 and 15 are used as illustrated in Figs. 1 and 2 for the purpose of increasing the range of the instrument and its accuracy at increased ranges. However, this construction may be modified if the instrument is designed for use at relatively shorter ranges, i. e. of the order of 100 yards or less. For such short ranges it may be desirable to rely only upon the human interocular, and Fig. 5 illustrates diagrammatically a modification of the invention suitable for such use. One eye of the observer is indicated at 50 as viewing the field through a single transparent mirror 52, and the reticle system comprises light source 54, reticle 55, and lens 56. Many other modifications will doubtless be apparent to those skilled in the art, and are to be construed as coming within the scope of the invention.

It is to be noted that light proceeding from any reticle means such as a light source or filament thereof or an indicia mark located in the focal plane of lens 24 will be collimated while if such light source or filament or indicia mark is located inside of the focal plane, that is nearer an observer than the focal plane, the lens will not bring the light rays into collimation or paralellism but will leave them slightly divergent as they approach the eyes of the observer. This is a physical characteristic of any collimator lens and throughout the specification and claims the term "collimator lens" is intended to have a meaning which embraces this characteristic.

It is also to be understood that the following claims are intended to cover all the generic and specific features of the invention herein described, and all statements of the scope of the invention which, as a matter of language, might be said to fall therebetween.

What is claimed is:

1. In a binocular range finder, in combination, a reticle comprising a plurality of indicia, a collimating lens positioned between said reticle and the eyes of an observer, means for superimposing a single image of said reticle upon the field of view, said image being at all times visible to both eyes of an observer, and means for so positioning said reticle with respect to said lens that each of said indicia is positioned a predetermined different distance from the focal plane of said lens, the apparent position of said image in said field of view being a function of the distance between said reticle and the focal plane of said lens.

2. In a binocular range finder, in combination, a reticle comprising a plurality of indicia, a collimating lens positioned between said reticle and the eyes of an observer, means for superimposing a single image of said reticle upon the field of view, said image being at all times visible to both eyes of an observer, and means for so positioning said reticle with respect to said lens that each of said indicia is positioned a predetermined different distance from the focal plane of said lens, said reticle comprising a plurality of superimposed sheets, each of said sheets bearing an indicium, the apparent position of said image in said field of view being a function of the distance between said reticle and the focal plane of said lens.

3. In a binocular range finder, in combination, a reticle comprising a plurality of indicia, a collimating lens positioned between said reticle and the eyes of an observer, means for superimposing a single image of said reticle upon the field of view, said image being at all times visible to both eyes of an observer, and means for so positioning said reticle with respect to said lens that each of said indicia is positioned a predetermined different distance from the focal plane of said lens, said reticle comprising a plurality of superimposed sheets, each of said sheets bearing an indicium, said sheets being so positioned that the axis of said lens is substantially normal thereto, the apparent position of said image in said field of view being a function of the distance between said reticle and the focal plane of said lens.

4. In a binocular range finder, in combination, a reticle comprising means providing a plurality of spaced, unconnected indicia, a collimating lens positioned between said reticle and the eyes of an observer, means for superimposing a single image of said reticle upon the field of view, said image being at all times visible to both eyes of an observer, and means for so positioning said reticle with respect to said lens that each of said indicia is positioned a predetermined different distance from the focal plane of said lens, the apparent position of said image in said field of view being a function of the distance between said reticle and the focal plane of said lens.

5. In a binocular range finder, in combination, a reticle comprising a plurality of indicia, a collimating lens positioned between said reticle and the eyes of an observer, means for superimposing a single image of said reticle upon the field of view, said image being at all times visible to both eyes of an observer, and means for so positioning said reticle with respect to said lens that each of said indicia is positioned a predetermined different distance from the focal plane of said lens, said reticle comprising a plurality of superimposed transparent sheets, each of said sheets bearing an indicium, the apparent position of said image in said field of view being a function of the distance between said reticle and the focal plane of said lens.

6. In a binocular range finder, in combination, a reticle comprising a plurality of indicia, a collimating lens positioned between said reticle and the eyes of an observer, means for superimposing a single image of said reticle upon the field of view, said image being at all times visible to both eyes of an observer, and means for so positioning said reticle with respect to said lens that each of said indicia is positioned a predetermined different distance from the focal plane of said lens, said reticle comprising a plurality of superimposed sheets, each of said sheets bearing an indicium, there being not more than one indicium on the contacting surfaces of any two sheets, the apparent position of said image in said field of view being a function of the distance between said reticle and the focal plane of said lens.

7. In a binocular range finder, in combination, a reticle, a collimating lens positioned between said reticle and the eyes of an observer, means for superimposing a single image of said reticle upon the field of view, said image being at all times visible to both eyes of an observer, and means for predeterminedly positioning said reticle with respect to the focal plane of said lens to determine the apparent position of said reticle image within said field of view.

8. In a binocular range finder, in combination, a reticle comprising a plurality of indicia, a collimating lens positioned between said reticle and the eyes of an observer, transparent mirror means for superimposing a single image of said reticle upon the field of view, said image being at all times visible to both eyes of an observer, and means for so positioning said reticle with respect to said lens that each of said indicia is positioned a predetermined different distance from the focal plane of said lens, the apparent position of said image in said field of view being a function of the distance between said reticle and the focal plane of said lens.

9. In a binocular range finder, in combination, a reticle comprising a plurality of indicia, a collimating lens positioned between said reticle and the eyes of an observer, means for increasing the effective interocular of an observer, means for superimposing a single image of said reticle upon the field of view, said image being at all times visible to both eyes of an observer, and means for so positioning said reticle with respect to said lens that each of said indicia is positioned a predetermined different distance from the focal plane of said lens, the apparent position of said image in said field of view being a function of the distance between said reticle and the focal plane of said lens.

10. In a binocular range finder, in combination, a reticle comprising a plurality of indicia, a collimating lens positioned between said reticle and the eyes of an observer, means for increasing the effective interocular of an observer and for superimposing a single image of said reticle upon the field of view, said image being at all times visible to both eyes of an observer, said means comprising a pair of reflecting surfaces and a pair of transparent mirrors positioned intermediate said reflecting surfaces and between said lens and an observer, and means for so positioning said reticle with respect to said lens that each of said indicia is positioned a predetermined different distance from the focal plane of said lens, the apparent position of said image in said field of view being a function of the distance between said reticle and the focal plane of said lens.

EDWIN H. LAND.